United States Patent
Baysinger

(10) Patent No.: US 7,979,054 B2
(45) Date of Patent: Jul. 12, 2011

(54) SYSTEM AND METHOD FOR AUTHENTICATING REMOTE SERVER ACCESS

(75) Inventor: Mark Wayne Baysinger, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 952 days.

(21) Appl. No.: 11/550,902

(22) Filed: Oct. 19, 2006

(65) Prior Publication Data

US 2008/0098225 A1   Apr. 24, 2008

(51) Int. Cl.
*H04M 1/66* (2006.01)
(52) U.S. Cl. ........ 455/411; 455/410; 455/466; 713/168; 380/247; 380/277
(58) Field of Classification Search .................. 455/410, 455/411, 466; 713/168, 169, 170, 171, 182, 713/183, 185; 709/229; 726/2, 3, 27
See application file for complete search history.

(56) References Cited

U.S. PATENT DOCUMENTS

| | | | | |
|---|---|---|---|---|
| 5,299,263 | A * | 3/1994 | Beller et al. .................... 380/30 |
| 5,455,863 | A * | 10/1995 | Brown et al. .................. 380/247 |
| 5,592,555 | A * | 1/1997 | Stewart .......................... 380/247 |
| 5,787,154 | A * | 7/1998 | Hazra et al. ................. 379/93.03 |
| 6,010,067 | A * | 1/2000 | Elbaum ........................... 235/380 |
| 6,104,815 | A * | 8/2000 | Alcorn et al. ................. 380/251 |
| 6,453,159 | B1 * | 9/2002 | Lewis ............................. 455/411 |
| 6,711,400 | B1 * | 3/2004 | Aura ............................... 455/411 |
| 6,807,410 | B1 * | 10/2004 | Pailles et al. .................. 455/407 |
| 7,024,557 | B1 * | 4/2006 | Moles et al. ................... 713/170 |
| 7,043,230 | B1 | 5/2006 | Geddes et al. |
| 7,107,620 | B2 * | 9/2006 | Haverinen et al. .............. 726/29 |
| 7,143,443 | B2 * | 11/2006 | Song et al. ....................... 726/29 |
| 7,222,363 | B2 * | 5/2007 | Rice et al. .......................... 726/5 |
| 7,266,693 | B1 * | 9/2007 | Potter et al. .................... 713/169 |
| 7,379,921 | B1 * | 5/2008 | Kiliccote ......................... 705/75 |
| 7,386,727 | B1 * | 6/2008 | Rover et al. .................... 713/176 |
| 7,412,224 | B2 * | 8/2008 | Kotola et al. ................. 455/403 |
| 7,418,596 | B1 * | 8/2008 | Carroll et al. ................. 713/169 |
| 7,447,494 | B2 * | 11/2008 | Law et al. ...................... 455/410 |
| 7,529,371 | B2 * | 5/2009 | Chen et al. ..................... 380/247 |
| 7,650,500 | B2 * | 1/2010 | Matoba .......................... 713/163 |
| 7,706,838 | B2 * | 4/2010 | Atsmon et al. ................ 455/558 |
| 7,801,510 | B2 * | 9/2010 | Jung et al. ..................... 455/411 |

(Continued)

FOREIGN PATENT DOCUMENTS

KR   2004098534   11/2004

(Continued)

OTHER PUBLICATIONS

International Search Report—PCT/US07/082018—International Search Authority, European Patent Office—Oct. 6, 2008.

(Continued)

*Primary Examiner* — Sharad Rampuria
(74) *Attorney, Agent, or Firm* — Fariba Yadegar-Bandari; Robert J. O'Connell

(57) ABSTRACT

A system and method for providing secure authentication for website access or other secure transaction. In one embodiment, when a user accesses a website, the web server identifies the user, and sends an authentication request to the user's mobile device. The mobile device receives the authentication requests and sends back authentication key to the web server. Upon verifying the authentication key, the web server grants the access to the user.

35 Claims, 5 Drawing Sheets

U.S. PATENT DOCUMENTS

| | | | |
|---|---|---|---|
| 7,801,517 B2 * | 9/2010 | Silvestri | 455/423 |
| 7,802,097 B2 * | 9/2010 | May | 713/171 |
| 7,817,986 B2 * | 10/2010 | Bonta et al. | 455/411 |
| 2003/0135588 A1 * | 7/2003 | Bouthors | 709/219 |
| 2003/0220107 A1 * | 11/2003 | Lioy et al. | 455/435.1 |
| 2004/0029569 A1 * | 2/2004 | Khan et al. | 455/414.1 |
| 2005/0268107 A1 * | 12/2005 | Harris et al. | 713/182 |
| 2007/0082656 A1 * | 4/2007 | Stieglitz et al. | 455/411 |
| 2008/0254765 A1 * | 10/2008 | Eliaz | 455/406 |
| 2009/0217035 A1 * | 8/2009 | Abdul Hameed Khan | 713/168 |
| 2009/0328186 A1 * | 12/2009 | Pollutro et al. | 726/13 |

FOREIGN PATENT DOCUMENTS

| | | |
|---|---|---|
| KR | 2004-0103581 | 12/2004 |
| KR | 2006070994 | 6/2006 |
| WO | 0115381 | 3/2001 |

OTHER PUBLICATIONS

Written Opinion—PCT/US07/082018—International Search Authority, European Patent Office—Oct. 6, 2008.

* cited by examiner

SYSTEM AND METHOD FOR AUTHENTICATING REMOTE SERVER ACCESS

BACKGROUND OF THE INVENTION

1. Field of the Invention

The present invention generally relates to wireless telecommunications, and more specifically, relates to a system and method for authenticating server access requests through wireless communication network.

2. Description of the Related Art

The Internet is becoming a ubiquitous part of modern life with wireless and remote access common in large urban areas. People can access all kinds of information by searching the Internet and can also perform many functions of their daily life. People can pay utility bills, buy groceries, and rent videos all by accessing websites through the Internet. As people access different websites for different services, they have to remember different login information and passwords. Often people choose easy identification information and passwords, so they can easily remember them. However, information that is easy to remember also tends to have a low security level. To make things worse, often users write down their login information and passwords and thus making the information easily accessible to others.

Besides not securely guarding website login information, users have also become targets of increasingly creative cyber criminals using the Internet. One example of a crime using the Internet is "phishing," in which an authentic-looking email is sent to an unsuspected user asking the user to verify his information by clicking on a web link. The email looks authentic to the emails normally sent by another entity, such as the user's bank. After the user clicks on the web link, an authentic looking bank web page is shown to him and he is asked to log in. After the user types in his identification information and password, the information is then captured by criminals who are actually operating this authentic-like web page. The criminals can then use the captured information to access the user's bank account and transfer the money out of the user's account. Usually, the user does not learn about the problem until it is too late to stop a fraudulent transfer.

Some websites have addressed the security issue by using smart cards or hardware tokens. However, these solutions either require users to carry extra piece of hardware, or the user's computers be fitted with special hardware. These solutions generally create inconvenience to the users and increase the cost for the website operators. Therefore, it is desirous to have an apparatus and method that provides additional security to website accesses without requiring additional equipment.

SUMMARY OF THE INVENTION

Briefly described, the apparatus and method of the invention provides secure authentication for website accesses from a remote wireless computer device. In one embodiment, there is provided a method for authenticating a user accessing a website. The method includes receiving user information from the user, identifying a communication device for the user, transmitting an authentication request to the communication device, receiving an authentication response from the communication device, and granting the user access to a website. In another embodiment, the method for authenticating a user accessing a website includes receiving an authentication request from a server, prompting the user to enter an identification information, verifying the identification information and sending authentication key to the server.

In yet another embodiment, an apparatus is provided for authenticating a user accessing a website, wherein the user has a wireless device. The apparatus includes a network interface unit, a storage unit, and an authentication unit. The network interface unit is capable of communicating with computing devices and wireless devices, receiving a website access request from a computing device and transmitting website contents to the computing device, sending an authentication request to the wireless device, and receiving authentication information from the wireless device. The storage unit is for storing user profiles and the website contents. The authentication unit is for analyzing the website access request, identifying a user profile, assembling the authentication request, and analyzing the authentication information.

In yet another embodiment, a system for securely authenticating a user requesting access to a website is provided. The system includes at least one computing device connected to a computer network and capable of accessing websites through the computer network, at least one wireless device in communication with a wireless communication network, and a server storing website contents for a website. The server is in communication with the computer network and the wireless communication network and is capable of receiving an access request from the at least one computing device and sending an authentication request to the at least one wireless device. The server further is capable of receiving authentication information from the at least one wireless device and sending an access grant to the at least one computing device.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "wireless device," "wireless telephone," and "mobile device" are used interchangeably; the terms "authentication information," and "authentication key" are used interchangeably. The term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

In overview, the system and method enables a secure authentication for website access. When a user accesses a website, he provides his user identification information (UID), such as user name, to the website. The website receives this information identifies the user and sends a short message to a pre-designated wireless device belonging to the user. The wireless device receives the short message and sends back a confirmation key to the website. The website confirms the confirmation key and grants access to the user. Note that, in one embodiment, no password is provided by the user when he first accessed the website, and the security is provided through the confirmation key stored in his wireless device. Moreover, while the exemplary embodiment of the invention is to access the website, other sites and computer interconnection where secure access is required are possible through the authentication process described herein, such as mailbox access, key transfer, portal handover, and other secure transactions as known in the art.

Figure 1:
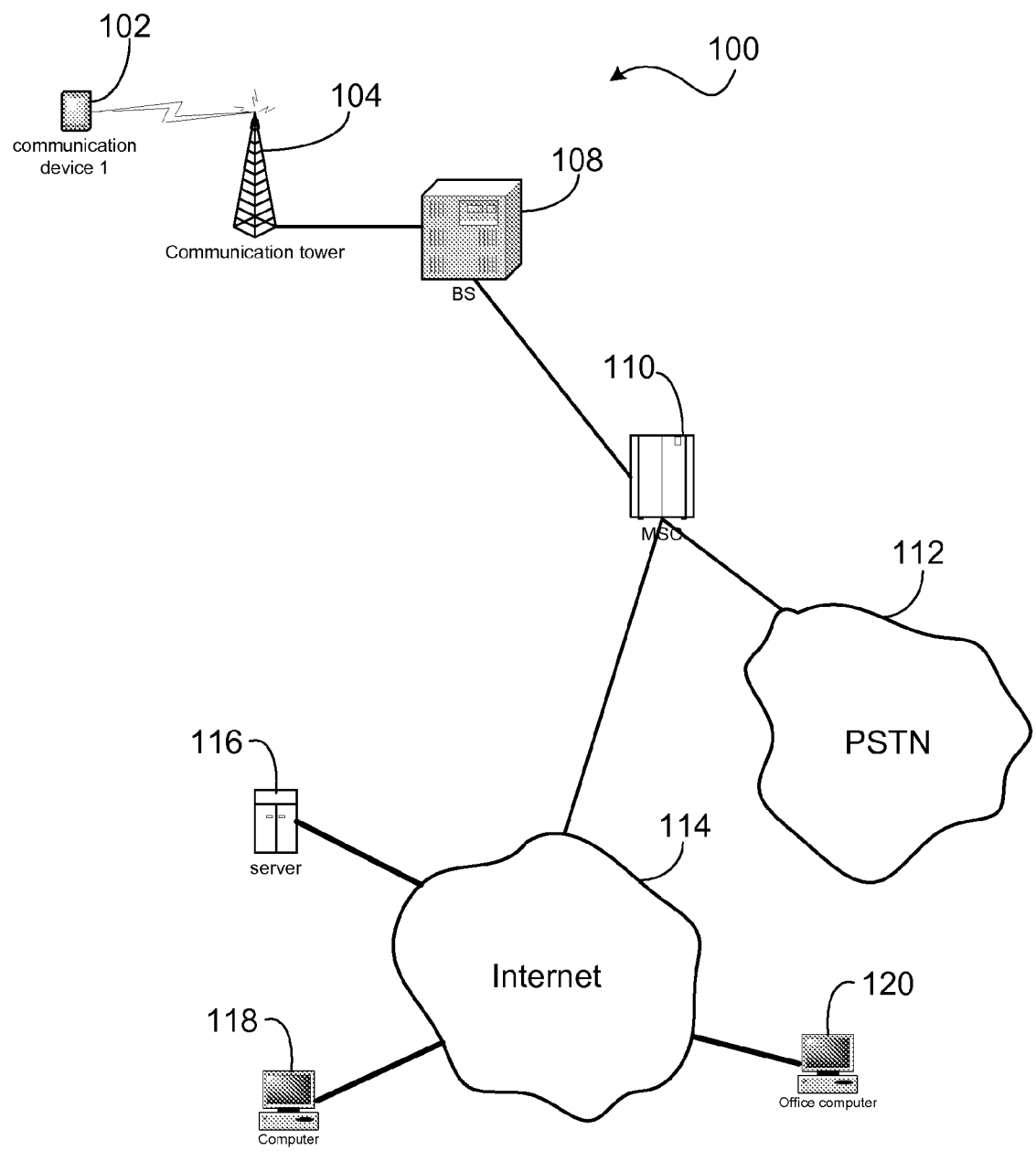
FIG. 1 illustrates an exemplary architecture of a network supporting secure website access authentication.

FIG. 1 depicts a communication network 100 supporting the present invention. The communication network 100 includes one or more communication towers 104, each connected to a base station (BS) 108 and serving users with communication device 102. The communication device 102 can be cellular telephones, pagers, personal digital assistants (PDAs), laptop computers, or other hand-held, stationary, or portable communication devices that support wireless communication. The commands and data input by a user are transmitted as digital data to the communication tower 104. The communication between a user using a communication device 102 and the communication tower 104 can be based on different technologies, such code division multiple access (CDMA), time division multiple access (TDMA), frequency division multiple access (FDMA), the global system for mobile communications (GSM), or other protocols that may be used in a wireless communications network or a data communications network.

Information between the wireless device(s) 102 and website is transmitted through data packets over the communication network 100. The wireless communication device 102 sends and receives data packets on an assigned communication channel and control data are sent and received through a data channel. The data packets from each device is sent from the communication tower 104 to a base station (BS) 108, and forwarded to a mobile switching center (MSC) 110, which may be connected to a public switched telephone network (PSTN) 112 and the Internet 114.

In an alternative embodiment (not shown), the MSC 110 may not be needed in a data-only network. In such embodiment, data packets are sent by the BS 108 to a packet data serving node and/or other servers for processing. The data packets are transmitted between the wireless device 102 and the BS 108 according to a predefined protocol such as Real-time Transport Protocol (RTP), TCP/IP, or other suitable protocols. The information embedded in the data packets, after processing, may be sent to a server 116 on the Internet, where the information is used. The server 116 may host a website that can be accessed by user computers, 118 and 120, through the Internet 114.

The network 100 as shown in this embodiment supports secure website authentication for a user on a computer 118 that attempts to access a website hosted by the server 116 through the Internet 114. It should be noted that the computer 118 could also have a wireless component, such as a cellular modem or other interface, such that there is not a separate computer 118 and wireless device 102, and thus the access and authentication could occur at the same device using the wireless communication pathway. In the present embodiment, however, the website prompts the user for an UID. The website (server 116) receives the UID and retrieves the user information stored in a user profile. From the user information, the server 116 identifies a wireless device 102 to which an authentication request is sent. The authentication request travels through the Internet and is transmitted (here as a short message through a short message service (SMS)) to the wireless device 102. The wireless device 102 receives the SMS message and prompts the user to enter a security code. The security code may be a personal identification number (PIN) or other key. The wireless device 102 receives the PIN, verifies that the user is the proper owner of the wireless device 102, and sends an authentication confirmation (or an authentication key) back to the server 116. Only after receiving the authentication confirmation (or key and verifying the authentication key), will the server 116 grant the website access to the user. Alternatively, the website can generate a session identification information (session ID) and this session ID is provided to the user via the web page. The user would enter this session ID into the wireless device 102 along with the PIN. The session ID is then sent to the server along with the authentication key and used to identify the web access that the user is attempting to access.

Figure 1A:
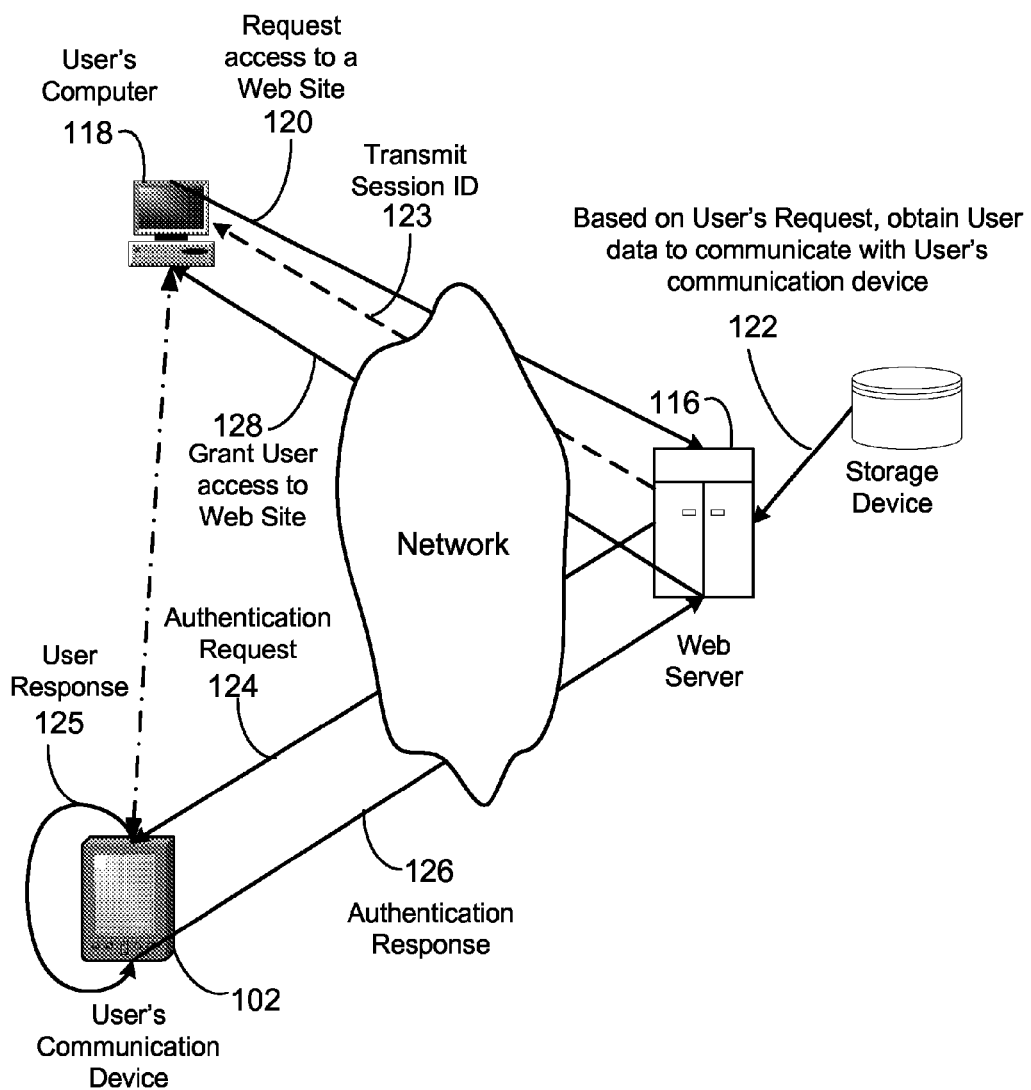
FIG. 1A illustrates an exemplary architecture of one embodiment of a user computer in communication with a user communication device to access a website.

FIG. 1A illustrates an exemplary architecture of one embodiment of a user computer 118 in communication with a user communication device 102 to access a website. The user computer 118 requests to access website (step 120) and the request can include a UserID, a Password, and/or any other data (such as a "Cookie" or other temporary internet file) that identifies the user. Based on User's Request (step 120) the server 116 and or other devices in communication therewith that can support a website, obtain User data (step 122) to communicate with User's communication device, which may include a communications Device ID; and Communications Device IP; a Communications Device phone # or PIN, or other identifying data as known in the art. In some embodiments, the web's server 116 then transmits a session ID back to the user computer as shown at step 123. The web server 116 transmits In parallel or separate execution, the web server 116, requests authentication through an authentication request (step 124) from the user device 102, which accordingly receives a user response, shown at step 125, and the user device 102 then sends an authentication response 126, that can include an Authentication Confirmation, an Authentication Key, a Session ID, an Authentication Key encrypted with Session ID, and/or variations of other combinations of authentication data or session keys. The user is then granted access to the website, shown by step 128. Note that the web server 116 can verify the location to which the Authentication Key is sent as known in the art, such as sending the Authentication Key to the specific device that requested access.

Figure 2:
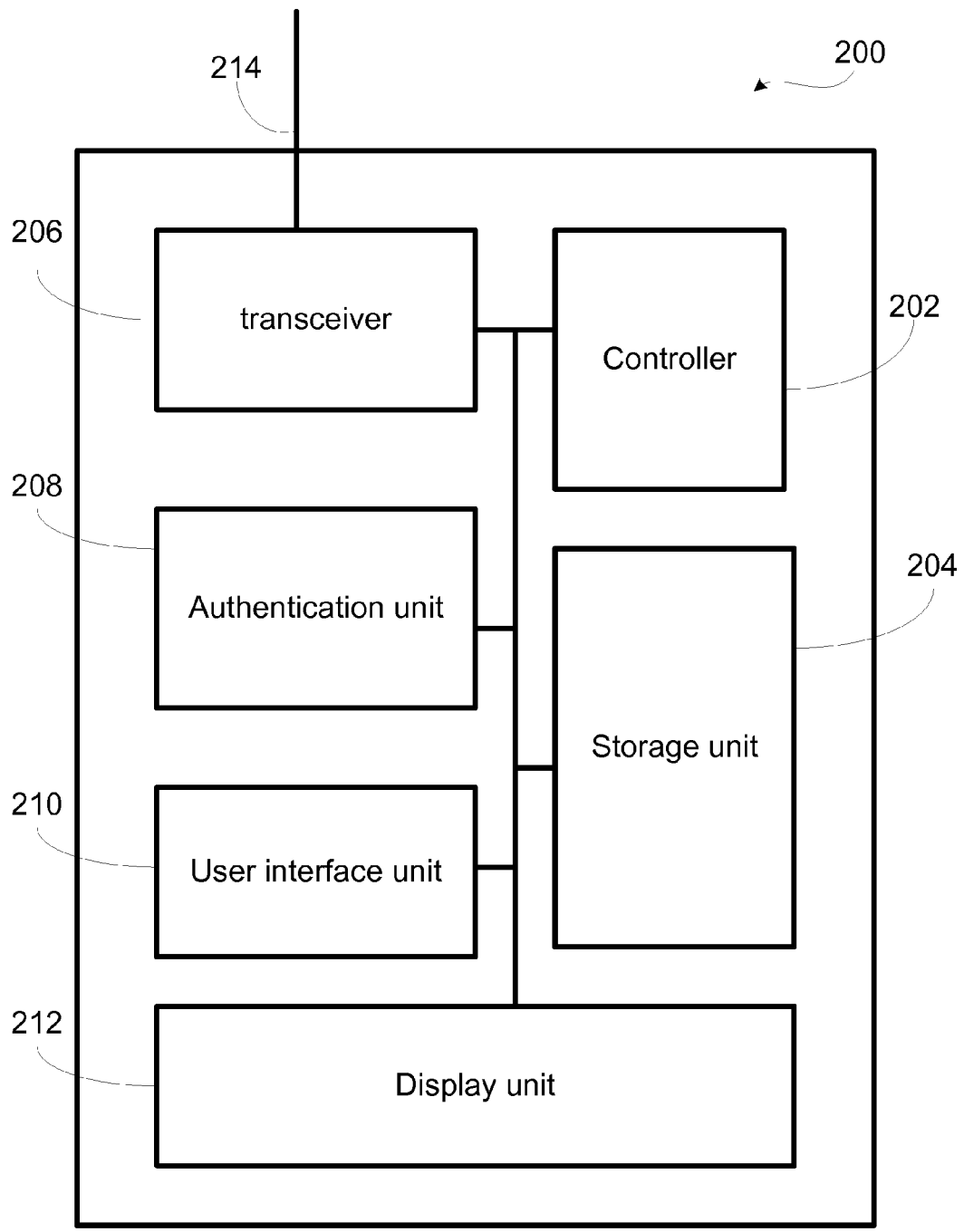
FIG. 2 is a block diagram of an exemplary embodiment of a wireless device seeking to access a website.

FIG. 2 illustrates a block diagram 200 of a wireless handset 102. The wireless handset 102 includes a controller 202, a storage unit 204, a display unit 212, a user interface unit 210, an authentication unit 208, a transceiver 206, and an antenna 214. The controller 202 can be hardware, software, or a combination thereof. The controller 202 is capable of digitizing authentication information into data packets and sending them to the server 116. The controller 202 is also capable of receiving the data packets from the server 116 and converting them into useful information. The display unit 212 may display graphical images or information about an incoming authentication request to the user. The user interface unit 210 controls hardware, such as speaker, microphone, display unit 212, and keypad used for communication with the user. The transceiver 206 transmits and receives radio signals to and from the communication tower 104, where the radio signals include commands and the data packets. The controller 202 interprets commands and data received from the user and the communication network 100. The storage unit 204 stores authentication information (key) and other communication parameters. The authentication unit 208 can be hardware, software, or a combination thereof. The authentication unit 208 checks the received authentication request, confirms the user's identity (for example, through input of PIN or other security protocol), retrieves the authentication key from the storage unit 204, and sends the authentication key to the server 116.

Figure 3:
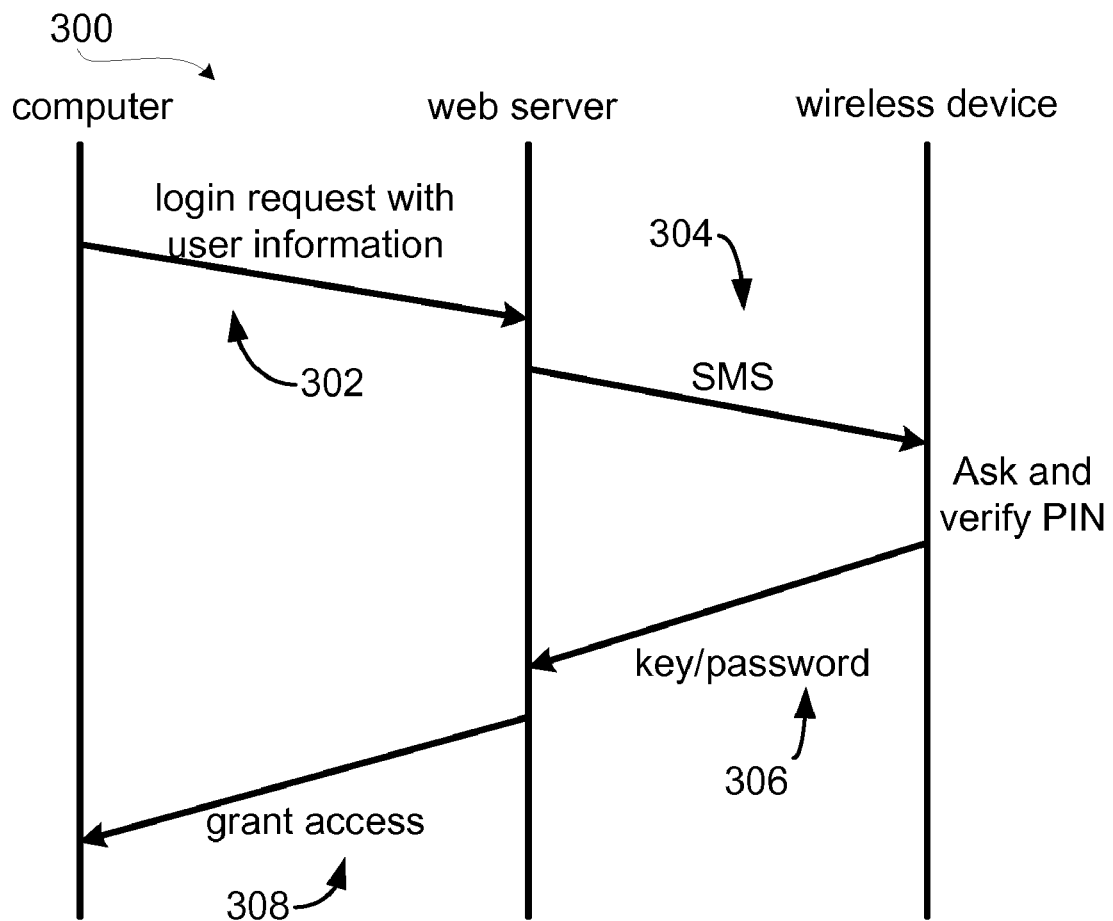
FIG. 3 illustrates information exchange during an authentication process.

FIG. 3 is a diagram 300 illustrating one embodiment of an information exchange during an authentication process. When the user first establishes an account with a secure website, the user provides his information to the web server, information such as his wireless device number, shown at step 302. In this embodiment, the user's wireless device is equipped with a special application for handling of authentication requests received from the web server. However, the special application is not necessary for such handling of authentication requests. An authentication key is encrypted and stored in the wireless device. The authentication key can be encrypted using a user selected information, such as a PIN. Alternatively, the authentication key may be simply stored in the user's wireless device and not encrypted. The wireless device communicates with the web server through a secure socket layer (SSL), or preferably, but not necessarily, another secure communication link. When a user tries to access a website through a computer on the Internet, the computer receives the user information from the user and sends a login request with the user's information to a web server hosting the website. The web server identifies the user through the user information, retrieves a user profile, generates a session identification (ID), and provides the session ID to the user through a display. The web server also sends an authentication request in a SMS message (step 304) to the user's wireless device identified from the user profile. The wireless device, upon receiving the SMS message, prompts the user to enter the session ID to confirm the user's identity. The wireless device sends the authentication information (authentication key) along with the session ID back to the web server, shown at step 306. The web server receives the authentication key, uses it to authenticate the session, and grants access to the user, shown at step 308. Alternatively, the authentication key stored in the wireless device can be further encrypted using the PIN. In this case, the PIN would not be stored in the wireless device and a third party would not be able to retrieve the authentication key even if in possession of the wireless device.

Figure 4:
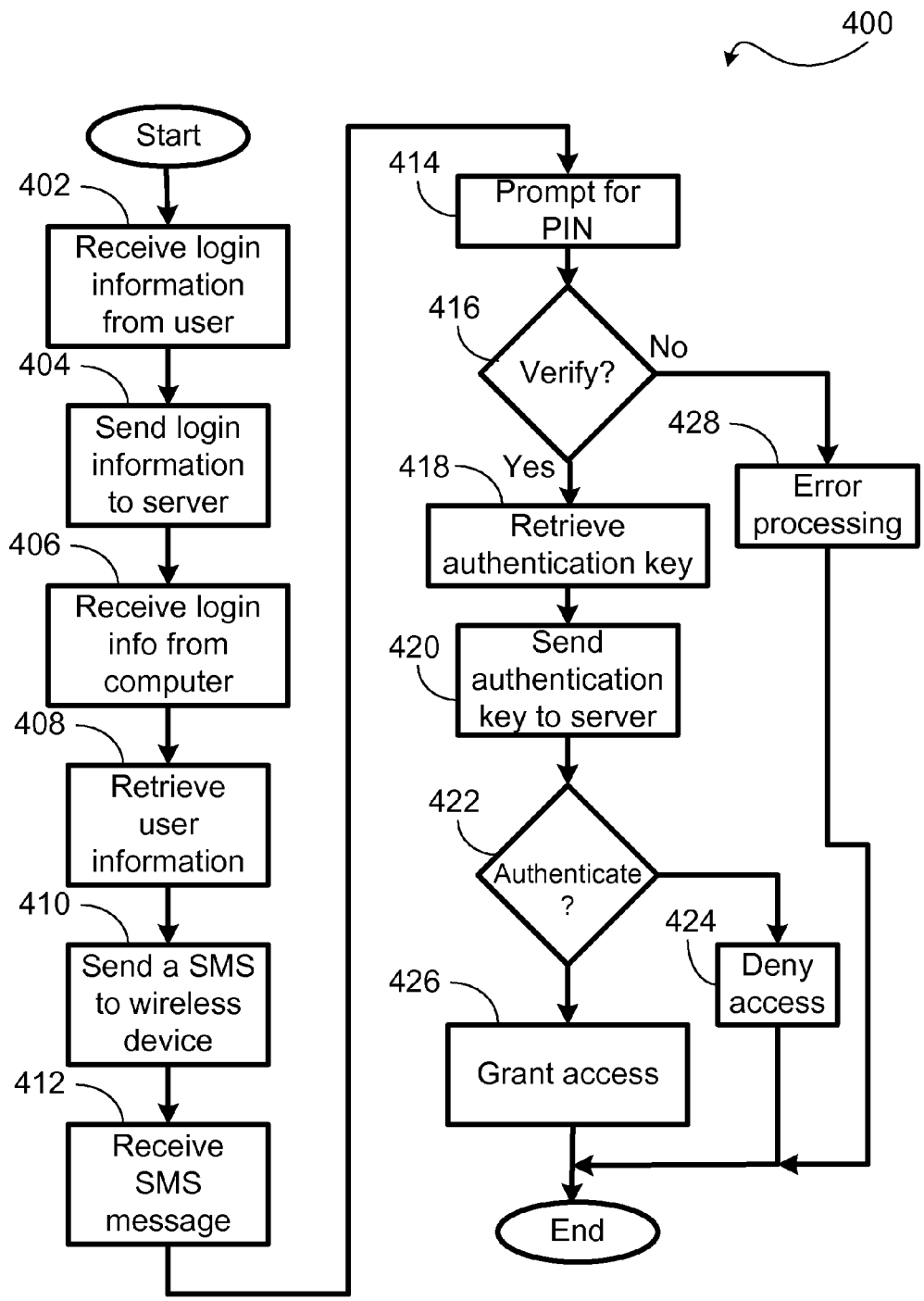
FIG. 4 is a flow chart for an exemplary embodiment of an authentication process.

FIG. 4 is a flow chart 400 for one embodiment of a website authentication process from a user computer. When a user wants to access a website, the user provides login information, and the login information is received by the computer, step 402. The computer then sends the login information to a server hosting the website, step 404. The server receives the login information, step 406, and uses the received information to retrieve the user information, step 408. The user information includes identification information for the user's wireless device, and can include other data. In this embodiment, the authentication request is sent as a SMS message to the wireless device. Although, use of SMS to send and/or receive the authentication request is not necessary and other data paths can be alternately used.

The wireless device receives the SMS message, step 412, and identifies the SMS message as an authentication request. The wireless device prompts the user to enter a PIN and session ID, step 414. The wireless device receives the PIN and verifies the PIN, step 416, and retrieves the authentication key previously stored in the wireless device, step 418. If the PIN supplied by the user is not correct, then the wireless device starts an error handling routine, step 428. The error handling routine may include sending a denial message back to the server. After retrieving the authentication key, the wireless device sends the authentication key and the session ID back to the server, step 420, through a SSL. The server receives the authentication key, uses it to authenticate the session, step 422, and grants the access to the user, step 426. If the authentication information does not authenticate the session, then the server denies the access to the user, step 424.

In an alternative embodiment, the server generates a session authentication code and displays this session authentication code to the user. The user has to enter this session authentication code in his wireless device when the authentication request is received by the wireless device. The session authentication code and the authentication key are sent back to the server by the wireless device, and the server checks for the session authentication code and the authentication key before granting the user access to the website. The use of session authentication code ensures that the user accessing the website is the same person holding the wireless device.

The following is a description of one use scenario illustrating a website access according to the invention. John opens a bank account with a local bank that offers on-line banking. The local bank asks for John's information, including his wireless telephone number, and stores the information. An authentication key is forwarded by the bank to a third party who sends it to John's wireless telephone (or John's computer) where it is stored. Later when John wants to check his bank account balance, John types the web address (a Universal Resource Locator URL address) of the local bank into a web browser on his computer. The web browser displays the local bank's website and prompts John to enter his UID. After John entered his UID, the computer sends the UID through the Internet to a server hosting the local bank's website. The server uses the UID to retrieve John's profile and from the retrieved profile, the server obtains John's wireless telephone number. The server generates a session ID based upon the authentication of the user, such as through the session identification code, and displays it to John via a web page. The server prepares a message with an authentication request and sends the message to John's wireless telephone. The message is ultimately transmitted to John's wireless telephone as a SMS message. Alternatively, those skilled in the art will appreciate that the message may also be sent with different formats, such as text, code, EMS, MMS, HTML, RTF and the like, and through different messaging channels, to include data, voice, or Internet (WIFI).

The wireless telephone receives the SMS message, and then the wireless telephone prompts John to enter a PIN and the session ID. By prompting for the PIN, the wireless telephone ensures that the wireless device is being used by its rightful owner. After receiving the PIN, the wireless telephone retrieves the authentication key according to the authentication request received. It is possible that there is more than one authentication key stored in the user's wireless telephone, and each authentication key is identified by a corresponding authentication request. After the authentication key is retrieved, it is sent back to the server along with the other data sufficient to create a session ID. The session ID helps the server to associate the authentication key with the proper web access request. After the server receives the authentication key and the session ID, the server verifies the authentication key and grants access to John.

In view of the method being executable on a web server or a wireless communications device, the method can be performed by a program resident in a computer readable medium, where the program directs a server or other computer device having a computer platform to perform the steps of the method. The computer readable medium can be the memory of the server, or can be in a connective database.

Further, the computer readable medium can be in a secondary storage media that is loadable onto a wireless communications device computer platform, such as a magnetic disk or tape, optical disk, hard disk, flash memory, or other storage media as is known in the art.

In the context of FIG. 4, the method may be implemented, for example, by operating portion(s) of the wireless communication network, such as a wireless communications device or the server, to execute a sequence of machine-readable instructions. The instructions can reside in various types of signal-bearing or data storage primary, secondary, or tertiary media. The media may comprise, for example, RAM (not shown) accessible by, or residing within, the components of the wireless communication network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it is understood by those skilled in the art that various changes in form and detail may be made without departing from the spirit and scope of the present invention as set forth in the following claims. For example, the description above is based on a wireless telecommunication network and the Internet, it is understood the apparatus, system, and method can be easily modified to support other type of communication infrastructure. Furthermore, although elements of the invention may be described or claimed in the singular, the plural is contemplated unless limitation to the singular is explicitly stated.

What is claimed is:

1. A method for authenticating that a valid user is accessing a website from a remote computer device comprising:
   receiving user information from a computing device;
   identifying a communication device based upon the user information;
   transmitting an authentication request to the communication device on a wireless computer network, wherein the authentication request is configured to request at least an authentication key that is stored on the communication device;
   receiving an authentication response from the communication device, the authentication response containing at least the authentication key;
   determining if the authentication key is valid; and
   granting the computing device access to a website if the authentication key is valid.

2. The method of claim 1, further comprising retrieving a user profile based on the user information.

3. The method of claim 1, further comprising:
   generating a session code;
   displaying the session code to the user at the computing device; and
   determining if a session code received with the authentication response matches the generated session code.

4. The method of claim 1, wherein the authentication request is transmitted using an SMS message via a wireless communication network to the communication device.

5. The method of claim 1, wherein the computing device is granted access by transmitting a message to the computing device.

6. The method of claim 1, wherein the authentication response is received via a wireless communication network from the communication device.

7. The method of claim 1, wherein the computing device and communication device are the same computer device.

8. A method for authenticating, through a wireless device, a user accessing a website comprising:
   receiving at the wireless device an authentication request from a server;
   prompting the user to enter a security code;
   verifying the security code; and
   retrieving an authentication key from memory at the wireless device and sending the authentication key to the server if the security code is verified.

9. The method of claim 8, wherein the authentication request is received by an SMS message via a wireless communication network from the server.

10. The method of claim 8, wherein the authentication key is sent via a wireless communication network to the server.

11. The method of claim 8, further comprising:
    decrypting the authentication key after the authentication key is retrieved.

12. The method of claim 8, wherein the authentication request is received for a user accessing a website through another computing device.

13. The method of claim 8, further comprising:
    providing a notice to the user; and
    receiving a password from the user.

14. An apparatus for authenticating a user accessing a website hosted by a remote server, comprising:
    a network interface unit communicating with a wireless communication network, the wireless communication network being in communication with the server, the network interface unit being capable of receiving an authentication request from the server and transmitting an authentication key to the server;
    a storage unit for storing the authentication key, the authentication key being retrieved from the storage unit upon receipt of the authentication request; and
    an authentication unit for analyzing the authentication request and decrypting the authentication key.

15. The apparatus of claim 14, wherein the authentication unit is further capable of identifying the user through a Personal Identification Number (PIN).

16. A system for securely authenticating a user requesting access to a website, comprising:
    at least one computing device connected to a computer network and capable of accessing websites through the computer network;
    at least one wireless device in communication with a wireless communication network, the wireless communication network being in communication with the computer network; and
    a server hosting a website on the computer network, the server further being in communication with the computer network and the wireless communication network, the server being capable of receiving an access request from the at least one computing device and sending an authentication request to the at least one wireless device, wherein the authentication request is configured to request an authentication key that is stored on the at least one wireless device, the server further being capable of receiving the authentication key from the at least one wireless device and sending an access grant to the at least one computing device.

17. The system of claim 16, wherein the at least one wireless device further being capable of:

receiving the authentication request via the wireless communication network from the server;
prompting the user for a security code;
verifying the security code; and
sending the authentication key via the wireless communication network to the server if the security code is verified.

18. The system of claim 16, wherein the server is further capable of identifying the at least one wireless device through the access request.

19. The system of claim 16, wherein the server is further capable of verifying the authentication key.

20. A non-transitory computer-readable medium comprising instructions, which, when executed by a machine, cause the machine to perform operations, the instructions comprising:
instructions to receive user information from a computing device connected to a computer network;
instructions to identify a communication device for the user;
instructions to transmit an authentication request to the communication device, wherein the authentication request is configured to request at least an authentication key that is stored on the communication device;
instructions to receive an authentication response from the communication device, the authentication response containing at least the authentication key;
instructions to determine if the authentication key is valid; and
instructions to grant the computing device access to the website if the authentication key is valid.

21. The non-transitory computer-readable medium comprising instructions of claim 20, further comprising instructions to retrieve a user profile based on the user information.

22. The non-transitory computer-readable medium comprising instructions of claim 20, further comprising:
instructions to generate a session code;
instructions to display the session code to the user; and
instructions to determine if a session code received with the authentication response matches the generated session code.

23. The non-transitory computer-readable medium comprising instructions of claim 20, further comprising instructions to transmit an SMS message via a wireless communication network to the communication device.

24. The non-transitory computer-readable medium comprising instructions of claim 20, further comprising instructions to transmit a message to the computing device.

25. The non-transitory computer-readable medium comprising instructions of claim 20, further comprising instructions to receive the authentication key via a wireless communication network from the communication device.

26. A non-transitory computer-readable medium comprising instructions, which, when executed by a machine, cause the machine to perform operations, the instructions comprising:
instructions to receive at a wireless device an authentication request from a server;
instructions to prompt a user to enter a security code;
instructions to verify the security code; and
instructions to retrieve an authentication key from memory at the wireless device and send the key to the server if the security code is verified.

27. The non-transitory computer-readable medium comprising instructions of claim 26, further comprising instructions to receive an SMS message via a wireless communication network from the server.

28. The non-transitory computer-readable medium comprising instructions of claim 26, further comprising instructions to send the authentication key via a wireless communication network to the server.

29. The non-transitory computer-readable medium comprising instructions of claim 26, further comprising:
instructions to decrypt the authentication key after the authentication key is retrieved.

30. The non-transitory computer-readable medium comprising instructions of claim 26, wherein the security code is a password.

31. The non-transitory computer-readable medium comprising instructions of claim 26, wherein the instructions to prompt the user further comprise:
instructions to provide a notice to the user; and
instructions to receive a password from the user.

32. A method for providing a secure transaction for a remote computer device to a server, comprising:
receiving user information from a computing device;
identifying a communication device based upon the user information;
transmitting an authentication request to the communication device, wherein the authentication request is configured to request at least an authentication key that is stored on the communication device;
receiving an authentication response from the communication device, the authentication response containing at least the authentication key;
determining if the authentication key is valid; and
performing a secure transaction with the computing device if the authentication key is valid.

33. The method of claim 32, further comprising:
generating a session code;
displaying the session code to the user at the computing device; and
determining if a session code received with the authentication response matches the generated session code.

34. The method of claim 32, further comprising transmitting an SMS message via a wireless communication network to the communication device.

35. The method of claim 32, wherein the computing device and communication device are the same computer device, and the transmitting occurs on the computing device.

* * * * *